United States Patent [19]
Wynosky et al.

[11] Patent Number: 5,157,916
[45] Date of Patent: Oct. 27, 1992

[54] APPARATUS AND METHOD FOR SUPPRESSING SOUND IN A GAS TURBINE ENGINE POWERPLANT

[75] Inventors: Thomas A. Wynosky, Madison; Robert J. Mischke, Middletown, both of Conn.

[73] Assignee: United Technologies Corporation, Hartford, Conn.

[21] Appl. No.: 608,510

[22] Filed: Nov. 2, 1990

[51] Int. Cl.⁵ ............................................. F02K 3/02
[52] U.S. Cl. .................................. 60/204; 60/226.1; 60/264
[58] Field of Search ............... 60/226.1, 262, 264, 60/204

[56] References Cited

U.S. PATENT DOCUMENTS

| | | | |
|---|---|---|---|
| 3,477,231 | 11/1969 | Paulson | 60/226.1 |
| 3,542,152 | 11/1968 | Adamson et al. | 60/226.1 |
| 3,579,993 | 5/1971 | Tanner | 60/262 |
| 3,696,617 | 10/1972 | Ellis | 60/262 |
| 3,710,890 | 1/1973 | True et al. | 181/33 |
| 3,739,984 | 6/1973 | Tontini | 239/265 |
| 3,742,711 | 7/1973 | Timms | 60/226.1 |
| 3,910,375 | 10/1975 | Hache et al. | 60/264 |
| 3,987,621 | 10/1976 | Sabatella, Jr. et al. | 60/262 |
| 4,066,214 | 1/1978 | Johnson | 239/265 |
| 4,117,671 | 10/1978 | Neal et al. | 60/264 |
| 4,835,961 | 6/1989 | Presz, Jr. et al. | 60/264 |

FOREIGN PATENT DOCUMENTS 2353042  10/1974  Fed. Rep. of Germany ..... 60/226.1

OTHER PUBLICATIONS

AIAA Paper No. 73-654 by Paul M. Bevilaqua "An Evaluation of Hypermixing for VSTOL Aircraft Augmentors".
AIAA Paper No. 89-2925 by T. G. Tillman, R. W. Paterson, W. M. Presz, Jr. "Supersonic Nozzle Mixer Ejector".

Primary Examiner—Richard A. Bertsch
Assistant Examiner—Michael I. Kocharov
Attorney, Agent, or Firm—Gene D. Fleischhauer

[57] ABSTRACT

A method and apparatus for suppressing jet noise in a gas turbine engine powerplant 10 is disclosed. Various construction details are developed for providing sound suppression at sea level take-off operative conditions and not providing sound suppression at cruise operative conditions. In one embodiment, the powerplant 10 has a lobed mixer 152 between a primary flowpath 44 and a second flowpath 46, a diffusion region downstream of the lobed mixer region (first mixing region 76), and a deployable ejector/mixer 176 in the diffusion region which forms a second mixing region 78 having a diffusion flowpath 72 downstream of the ejector/mixer and sound absorbing structure 18 bounding the flowpath throughout the diffusion region. The method includes deploying the ejector/mixer 176 at take-off and stowing the ejector/mixer at cruise.

9 Claims, 4 Drawing Sheets

APPARATUS AND METHOD FOR SUPPRESSING SOUND IN A GAS TURBINE ENGINE POWERPLANT

The invention described herein was made in the performance of work under NASA contract and is subject to the provisions of Section 305 of the National Aeronautics and Space Act of 1958 (72 Stat. 435; 42 U.S.C. 2457).

DESCRIPTION

1. Technical Field

This invention relates to gas turbine engine powerplants and more particularly to a method and apparatus for suppressing sound in such a powerplant.

2. Background of the Invention

Gas turbine engine powerplants are used to propel aircraft which often must fly into crowded urban areas. Severe restrictions are imposed on operation of the aircraft or sound suppression structures are used to reduce to acceptable levels the aircraft noise that is heard by nearby residents. Sound suppression structure which intrudes into the flowpaths of the powerplant may cause aerodynamic losses in the jet stream of the powerplant. These aerodynamic losses decrease the efficiency of the engine and make the engine more costly to operate. And, the level of noise may still result in restrictions on the hours of operation of the airport or restrictions on the take-off and landing patterns followed by the aircraft. There is particular concern about noise at take-off of the aircraft because take-off requires the powerplants to supply a large amount of thrust at low altitude. This increases the level of noise that is heard by nearby residents.

One significant source of powerplant noise from gas turbine engines at low altitude, high power operative conditions, such as take-off, is the noise from the jet or stream of exhaust gases from the engine. The level of jet noise is proportional to the velocity of the exhaust stream. This "jet noise" results from shearing action between molecules of the exhaust stream on the interior of the stream or between molecules of the exhaust stream and molecules of the surrounding atmosphere as the exhaust stream leaves the engine.

One way to reduce the level of jet noise is to reduce the average velocity of the exhaust gases as shown in U.S. Pat. No. 3,710,890 entitled "Aircraft Engine Noise Suppression" issued to True et alia. True reduces jet noise by using an ejector to entrain additional amounts of air into the exhaust stream. This increases the mass flow of gases through the engine while decreasing the average velocity of the exhaust gases leaving the powerplant. The decreased velocity of the gases decreases noise by decreasing shearing between the gases and the atmospheric air.

Another way to reduce jet noise using an ejector is shown in U.S. Pat. No. 3,739,984 entitled "Thrust Augmenting And Sound Suppressing Apparatus And Method" issued to Tontini. Tontini reduces jet noise by using an ejector to tailor the velocity profile of the exhaust gases.

An ejector is used downstream of an aircraft engine in U.S. Pat. No. 4,835,961 entitled "Fluid Dynamic Pump" issued to Presz, Jr. et alia. Presz uses a lobed ejector to form large scale axial vortices which extend downstream from the ejector. The vortices provide convective mixing rather than shear mixing to the adjacent streams and actually increase thrust by entraining additional air.

The above art notwithstanding, scientists and engineers working under the direction of Applicants, assignee have sought to develop effective sound suppression apparatus which minimizes or avoids aerodynamic losses caused by the sound suppression structure.

DISCLOSURE OF INVENTION

This invention is in part predicated on the recognition that the type of ejector shown in U.S. Pat. No. 4,834,961 issued to Presz, the information of which is specifically incorporated herein by reference, is particularly useful as a sound suppression mixer and may be employed in a way that reduces flow losses associated with the mixer during cruise.

According to the present invention, a gas turbine engine powerplant having primary and secondary flowpaths for working medium gases has a lobed mixer for mixing gases from the flowpaths and a diffusion region spaced axially from the mixer which has an ejector and second mixer for providing additional gases to decrease the temperature and velocity of the flowpath gases exhausted from the powerplant.

In accordance with one embodiment of the present invention, the ejector/mixer is formed of a plurality of individual lobes having a deployed position which forms the ejector/mixer at high power, low altitude operative conditions and a stowed position in duct structure of the powerplant which removes the lobes from the working medium flowpath at lower power, higher altitude operative conditions.

According to the present invention, a method for operating a gas turbine engine powerplant at a high power, low altitude operative condition includes mixing the primary and secondary flowpaths in a first mixing region with a lobed mixer and diverging the flowpath to increase mixing; and, at a location spaced axially from the lobed mixer, includes the step of flowing additional gases through the exterior of the powerplant through a lobed mixer/ejector and then flowing the mixing gases through a divergent region of the flowpath to increase mixing and over sound absorbing structure to decrease the acoustic energy of the gas stream.

In one particular method for operating the gas turbine engine powerplant, the lobed mixer is formed of a plurality of individually deployable lobes downstream of the first mixing region and includes the step of deploying the lobes from a stowed position in a wall of the powerplant to a deployed position in the flowpath at high power, low altitude operative conditions of the powerplant.

A primary feature of the present invention is a gas turbine engine powerplant having a primary flowpath and a secondary flowpath. Sound absorbing structure is disposed in the powerplant adjacent to the flowpaths. The powerplant has a first mixing region having a lobed mixer at the junction of the primary and secondary flowpaths and a diverging outer duct wall to increase convective mixing. In one embodiment, the diverging wall has a lobed ejector/mixer which extends through the outer duct wall to introduce gases into the engine that have a radial component of velocity and large axial vortices. The mixers are deployable at take-off and are stowed at cruise. Another feature of a detailed embodiment is a second ejector/mixer upstream of the mixer at the end of the gas turbine engine. The flowpath has a diverging outer duct wall downstream of the second ejector/mixer and upstream of the lobed mixer at the junction of the secondary flowpath and the primary flowpath. Another feature is the low radial profile in the outer duct wall of the deployable second ejector/mixer. The ejector/mixer has two axially extending sidewalls which are fixed in the flowpath and a flap which is movable from a stowed position in the outer duct wall to a deployed position which forms the ejector passage. In one detailed embodiment, the powerplant has a turbofan for adding additional energy to the working medium gases in the secondary flowpath. Alternatively, a duct burner is disposed in the secondary flowpath to provide additional energy by burning fuel in the secondary flowpath.

A primary advantage of the present invention is the level of sound suppression in a gas turbine engine powerplant which results from decreasing the velocity of the exhaust gases by increasing the mass flow of gases with an ejector/mixer and a diverging flowpath. Diverging the flowpath increases mixing of large-scale vortices formed by the ejector/mixer while the large-scale vortices enable sharp divergence of the flowpath without separation of the boundary layer. In one embodiment of the invention, an advantage is the engine efficiency which results from removing the ejector/mixer from the flowpath after take-off by using deployable lobed mixers. Removing the ejector/mixers avoids aerodynamic losses associated with such mixers at cruise. In one particular embodiment, an advantage is the powerplant efficiency which results from reducing drag by minimizing the overall radial profile of the gas turbine engine powerplant through the use of individual low profile, flap-type lobed mixers in the secondary flowpath. Another advantage is the level of sound suppression which results from disposing sound absorbing structure in walls adjacent to the secondary flowpaths and reducing flowpath velocities to increase the effectiveness of the sound absorbing structure.

The foregoing features and advantages of the present invention will become more apparent in light of the following detailed description of the best mode for carrying out the invention and the accompanying drawings.

BRIEF DESCRIPTION OF THE DRAWINGS

FIG. 2a is an exploded schematic view of a portion of a lobed ejector/mixer shown in FIG. 2.

FIG. 2b is a schematic view of a portion of a second lobed ejector/mixer shown in FIG. 2.

BEST MODE FOR CARRYING OUT THE INVENTION

Figure 1:
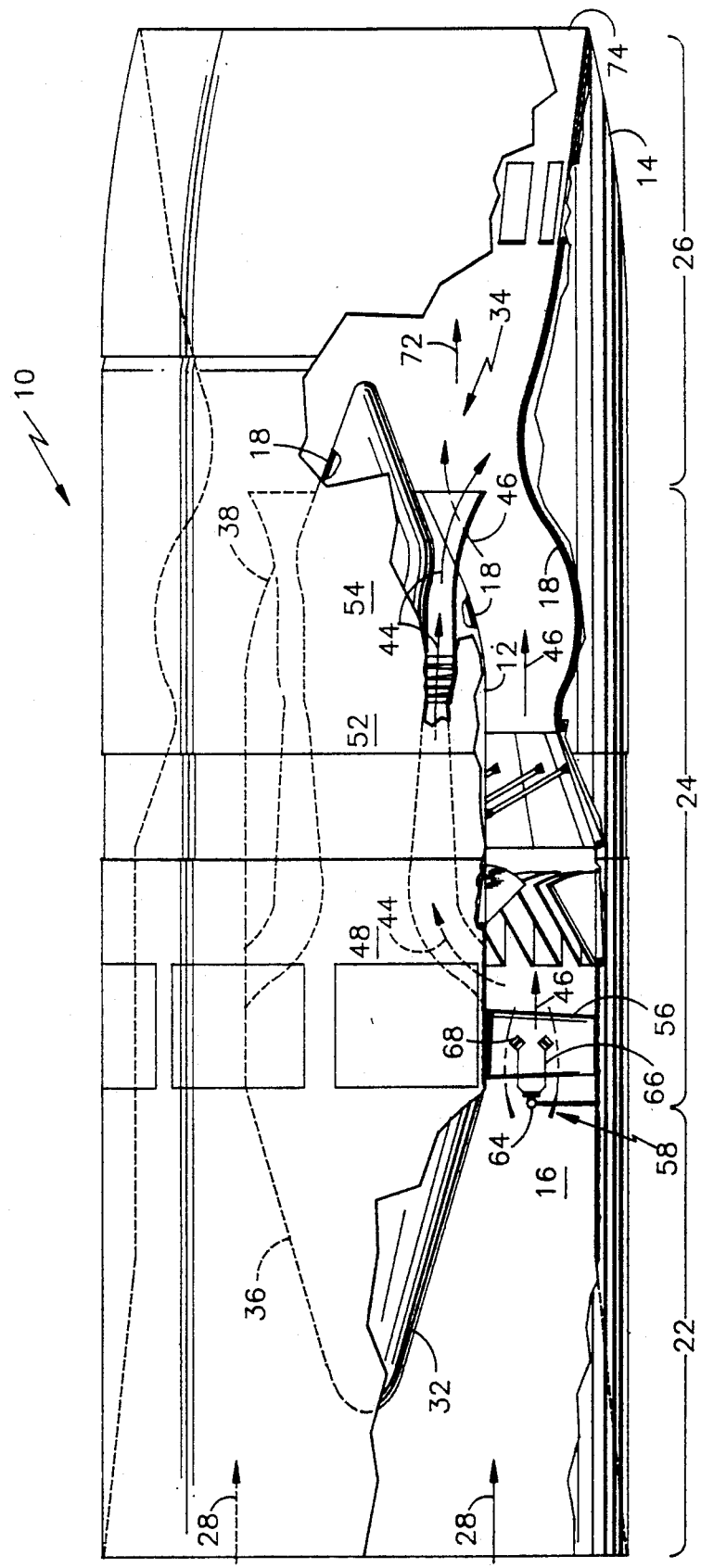
FIG. 1 is a side elevation view of a gas turbine engine powerplant with a portion of the exterior broken away to show the interior of the engine.

FIG. 1 is a side elevation view of a gas turbine engine powerplant embodiment 10 of the present invention. The powerplant has an axis of rotation $A_r$, a high power, low altitude operative condition such as sea level take-off and a low power, higher altitude operative condition such as cruise.

An inner duct wall 12 extends circumferentially about the axis $A_r$. An outer duct wall 14 is spaced radially from the inner duct wall leaving an annular passage for working medium gases therebetween. The outer duct wall extends forwardly and rearwardly beyond the inner duct wall. The outer duct wall and the inner duct wall have sound absorbing structure 18, such as honeycomb of the type normally used in the hot environment of the gas turbine engine. The sound absorbing structure absorbs sound energy from working medium gases as the gases pass through the gas turbine engine powerplant.

The powerplant has an inlet section 22, a gas turbine engine section 24 and a nozzle section 26. The inlet section is in flow communication with the exterior of the powerplant and has an inlet flowpath 28 for working medium gases. An inlet forward body 32 extends forwardly from the gas turbine engine section to inwardly bound the inlet flowpath. The outer duct wall extends axially to outwardly bound the inlet flowpath.

The gas turbine engine section 24 has a gas turbine engine 34. The engine has an upstream end 36 and a downstream end 38. An engine afterbody extends rearwardly from the engine. Extending between the ends are an annular primary flowpath 44 for working medium gases and an annular secondary flowpath 46 for working medium gases. The secondary flowpath is outwardly of and extends circumferentially about the primary flowpath through the annular passage 16.

The primary flowpath 44 is in flow communication with the inlet flowpath 28. The primary flowpath extends through a compressor 48, a combustor 52 and a turbine 54. The primary flowpath is outwardly bounded by the inner duct wall 12 at the downstream end 38 of the gas turbine engine. The engine afterbody 42 extends rearwardly from the engine to inwardly bound the primary flowpath.

The secondary flowpath for working medium gases is also in flow communication with the inlet flowpath 28. The compressor includes an array of fan blades 56 as shown in full for adding energy to the secondary flowpath 46.

An alternate means for adding energy to the secondary flowpath 46 might be used, as represented by the duct burner 58. The duct burner extends circumferentially about the secondary flowpath. The duct burner includes a combustion chamber 62 and means 64 for introducing fuel into the combustion chamber. The combustion chamber has an inner liner 66 having swirlers 68 for providing effective mixing of air from the secondary flowpath with fuel injected into the duct burner.

The nozzle section 26 is downstream of the gas turbine engine section. The nozzle section has a nozzle flowpath 72 for working medium gases. The nozzle flowpath is in flow communication with the primary 44 and secondary 46 flowpaths for working medium gases. The nozzle flowpath extends axially to the exit 74 of the gas turbine engine powerplant. The nozzle flowpath is outwardly bounded by the outer duct wall 14. Sound absorbing structure 18 is located on the outer duct wall and on the inner duct wall.

Figure 2:
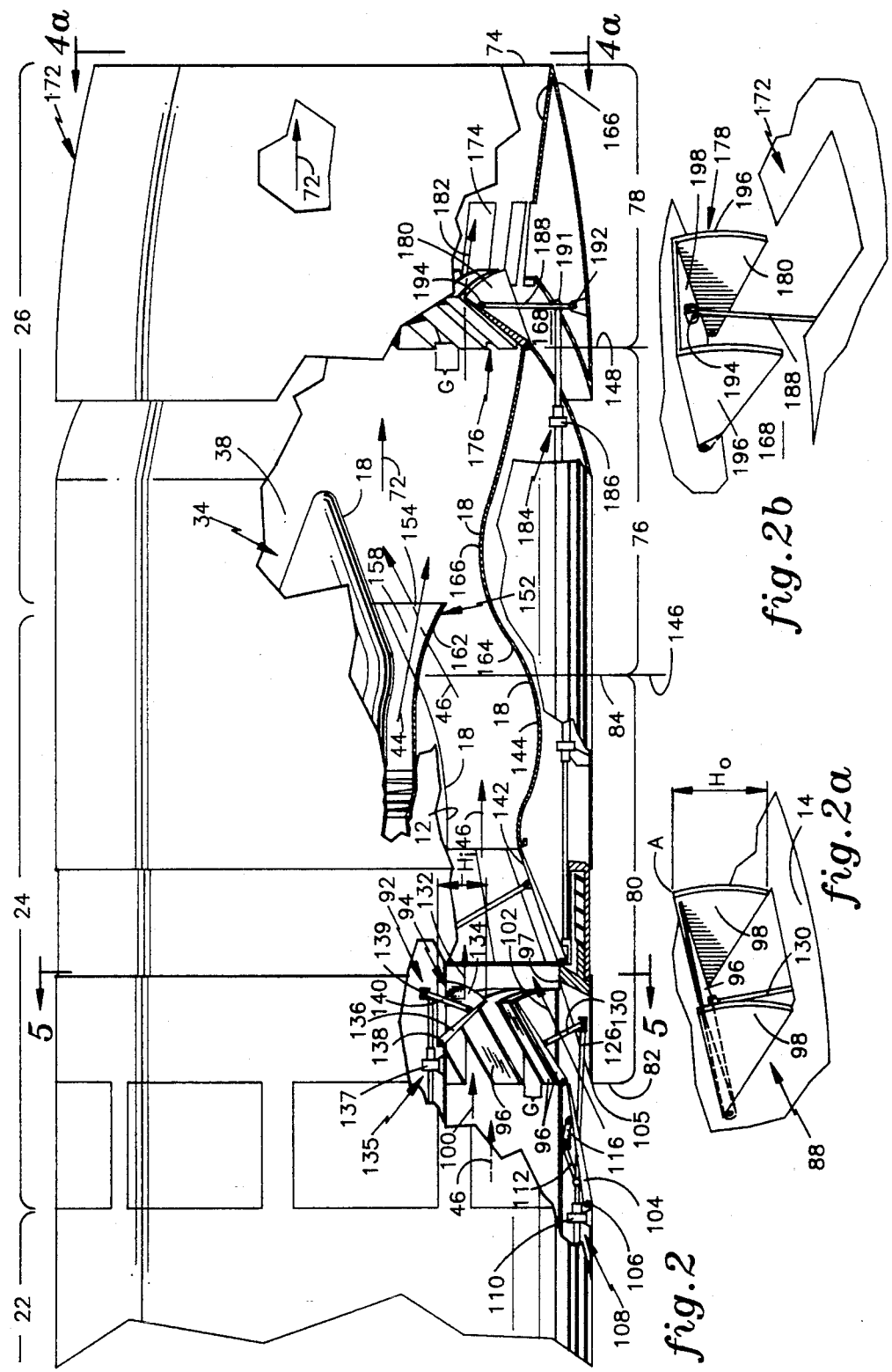
FIG. 2 is an enlarged portion of FIG. 1 showing portions of the sound suppression structure of the gas turbine engine powerplant in the deployed position at a high power, low altitude operative condition of the powerplant.

FIG. 2 is an enlarged side elevation view partially in cross section and partially broken away of a portion of the gas turbine engine powerplant 10 shown in FIG. 1. The sound absorbing structure 18 is represented by the face sheet 18 of the structure.

The powerplant 10 has a first mixing region 76 which begins at the downstream end 38 of the gas turbine engine 34 and extends into the nozzle section 22 of the powerplant. A second mixing region 78 is downstream of the first mixing region and extends to the exit 74 of the gas turbine engine powerplant. A third mixing region 80 is upstream of the first mixing region 76 and is entirely within the secondary flowpath 46. FIG. 2 shows the relationship of components of the powerplant to the flowpath in the first, second and third mixing regions at a high power, low altitude operative condition of the powerplant, such as would occur at a sea level take-off operative condition.

The third mixing region 80 is downstream of means for introducing energy into the secondary flowpath, such as the array of fan blades 56 or the duct burner 58. The third mixing region has an upstream end 82 and a downstream end 84. At the upstream end, a first ejector/mixer 86 formed of a plurality of circumferentially spaced ejector/mixer lobes 86. Each lobe extends inwardly from the outer duct wall 14. An optional second mixer 92 formed of a plurality of mixer lobes 94 extends outwardly from the inner duct wall 12.

Each outer ejector/mixer lobe 88 is shown in the deployed position and has a rotatable first flap 96 and a pair of sidewalls 98. The pairs of sidewalls 98 are each spaced from the other by a circumferential gap G leaving an axial passage 100 for working medium gases therebetween. The ejector passage 102 extends radially inwardly through the outer duct wall and between the first flap and the sidewalls. The ejector passage through the outer duct wall is bounded by a second, axially extending flap 104 and the duct wall 14. The second (outer) flap rotatably engages the outer duct wall at a hinged joint 106. A means for positioning the first flap, such as an actuator 108 having a ball and screw drive 110 connected by link to a unison ring 114. The unison ring extends circumferentially about the engine and is connected by a second link to the second flap.

The first flap 96 extends inwardly into the secondary flowpath 46 for working medium gases. The first flap rotatably engages the outer duct wall at hinge joint 122. The ball and screw drive 110 is connected by a first link 126 to a second unison ring 128. A second link 130 is rotatably attached to the first flap and to the second unison ring 128. The ball and screw drive may be driven in turn by an electric motor or other suitable means (not shown).

FIG. 2a is a schematic view of one of the ejector/mixer lobes 88 at each ejector passage. Each sidewall 98 extends in the radial inward direction and extends axially in the downstream direction, the height $H_o$ of each sidewall increasing in an downstream direction. The stowable first flap 96 of the ejector is movable from the deployed position A which forms the mixer lobe to a stowed position B which blocks the ejector passage.

As can be seen, the sidewalls 98 and ejector flap 96 form the chute-type mixer lobe 88 bounding the ejector flowpath 102. The flowpath provides a radial route for additional gases from the exterior of the engine to flow into the secondary flowpath 46. The gap G provides an axial flowpath 100 for gases from the secondary flowpath between the ejector chutes. Hot gases flow along the secondary flowpath between the lobes and inwardly from the lobes as cold gases are injected with a radial inward component of velocity to mix with the hot gases.

The first ejector/mixer 86 is complemented by the addition of the second mixer 92 with its plurality of mixer lobes 94 at the inner duct wall 12. The second plurality of mixer lobes are spaced circumferentially one from the other leaving a gap G' therebetween (not shown). A second, axially extending passage 132 for secondary working medium gases extends between each pair of these mixer lobes.

Each mixer lobe 94 has a pair of sidewalls 134 which extend in a radial outward direction and which extend axially in a downstream direction. The height $H_i$ of each sidewall increases in the downstream direction. A stowable flap 136 rotatably engages the inner duct wall between the upstream ends of the sidewalls at hinge joint 138. The stowable flap has a deployed position at which the door extends into the secondary flowpath at an angle to the inner duct wall. This forms the second plurality of chute-type mixer lobes 94 to drive a portion of the hot, secondary working medium gases radially outwardly into the inwardly driven cool gases from the exterior of the engine.

The outer duct wall in the third mixing region 80 has a part 142 which extends radially inwardly in a downstream direction to converge the secondary flowpath 46 and increase the velocity of the gases in that region. The third mixing region has a second part 144 which diverges thereafter in a downstream direction to diffuse the gases and increase mixing of the gases in the third mixing region. Sound absorbing structure 18, as represented by the face sheet of the structure, is disposed in the outer duct wall and the inner duct wall and faces the flowpath for working medium gases.

Figure 4:
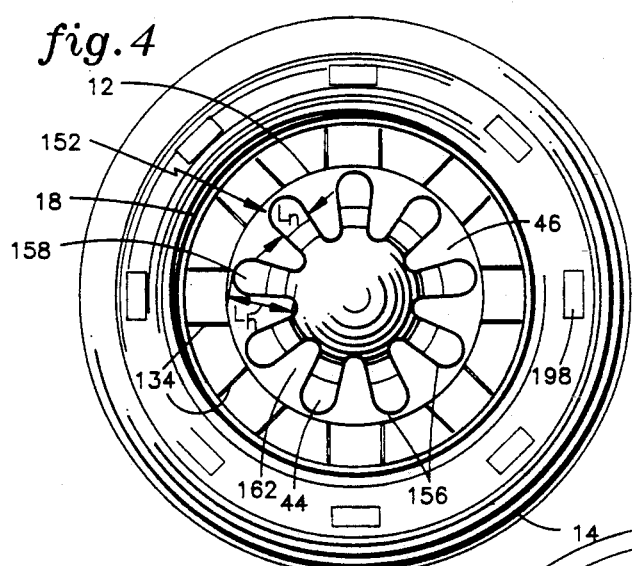
FIG. 4 is a view taken generally taken along lines 4—4 of FIG. 3.

The first mixing region 76 is downstream of the third mixing region 80 and has an upstream end 146 and a downstream end 148. The first mixing region has a lobed mixer 152 attached to the downstream end of the inner duct wall 12 at the downstream end 38 of the gas turbine engine. The lobed mixer has a wall portion 154 which extends circumferentially having a plurality of adjoining lobes 156, each lobe extending axially in the downstream direction as shown in FIG. 2 and FIG. 4. The plurality of lobes each have a radial height $L_h$ and a circumferential width $L_c$ which define the aspect ratio of the lobe.

Preferably, the aspect ratio and other parameters of the mixer will be in the ranges taught in U.S. Pat. No. 4,835,961 issued to Presz et alia. Each lobe 156 extends axially in a downstream direction and has a first plurality of passages 158 penetrating outwardly into the secondary flowpath 46, permitting radial outward flow of hot gases from the primary flowpath 44. The lobed mixer has a plurality of second passages 162 penetrating radially inwardly to permit radial inward flow of the relatively cooler working medium gases from the secondary flowpath. These gases were cooled in the third mixing region by intermixing of additional air from the exterior of the engine with gases from the secondary flowpath and eliminate hot streaks in the engine exhaust.

A first part 164 of the outer duct wall 14 in the first mixing region 76 is outwardly of the lobed mixer 152.

The first part of the outer duct wall converges towards the axis $A_r$ to increase the velocity of the working medium gases in the secondary flowpath. The outer duct wall has a second part 166 which diverges from the axis $A_r$ and the afterbody 42 converges toward the axis $A_r$ in the nozzle section 26 to cause diffusion and increased mixing of the gases from a secondary and primary flowpaths. The outer duct wall has sound suppression structure 18 facing the flowpath to absorb acoustic energy from the mixing gases.

The second mixing region 78 is downstream of the first mixing region 76 and has an annular ejector passage 168 which extends through the outer duct wall 14 to the nozzle flowpath 72 at the high power, low altitude operative condition of the powerplant. A movable nozzle exit body 172 and the adjacent structure of the nozzle section bound the annular ejector passage. The axially movable nozzle exit body is translatable rearwardly to open the annular ejector passage and may be used to vary the area of the ejector. The nozzle exit body is adapted by a plurality of openings 174 to receive an ejector/mixer 176 formed of a plurality of stowable ejector/mixer lobes 178 at each opening.

Each stowable ejector/mixer lobe 178 in the deployed position extends at an angle into the divergent part 166 of the flowpath 72 for working medium gases which extends rearwardly from the first mixing region 76. Each mixer lobe provides a local extension 180 of the annular ejector passage 168 for ejector flow which penetrates the nozzle flowpath through the chute-like ejector/mixer lobes 178.

The deployed ejector/mixer lobes 178 are circumferentially spaced one from the other leaving a gap G" therebetween. The gaps G" provide a plurality of axial passages 182 therebetween for hot, working medium gases of the nozzle flowpath 72. The lobes direct both hot gases and cool gases from the exterior of the engine into the working medium flowpath 72. This decreases the temperature and velocity of the exiting gases while increasing the mass flow of the gases through the nozzle section.

Each ejector/mixer lobe 178 is positionable by an actuator means 184 having a ball-screw drive 186 which drives the nozzle exit body 172 rearwardly or forwardly at hinge joint 191 in response to signals from a control system (not shown). The nozzle exit body 172 forms a rigid, circumferentially extending, translatable link or unison ring having a plurality of second links 188 rotatably attached thereto at hinge joint 192. Each second link 188 engages the stowable mixer lobe 178 at a hinge joint 194 to position the mixer lobe between a stowed position in the nozzle exit body and the deployed position in the working medium flowpath. The nozzle afterbody is slidable on T-racks (not shown) which provide additional support to the nozzle exit body from the remainder of the powerplant.

FIG. 2b is a schematic representation of an ejector/mixer lobe 178 in the deployed position. Each mixer lobe has a pair of radially extending sidewalls 196 and a face or flap 198 which extends in the circumferential direction between the radial sidewalls and is integral with the sidewalls.

Figure 3:
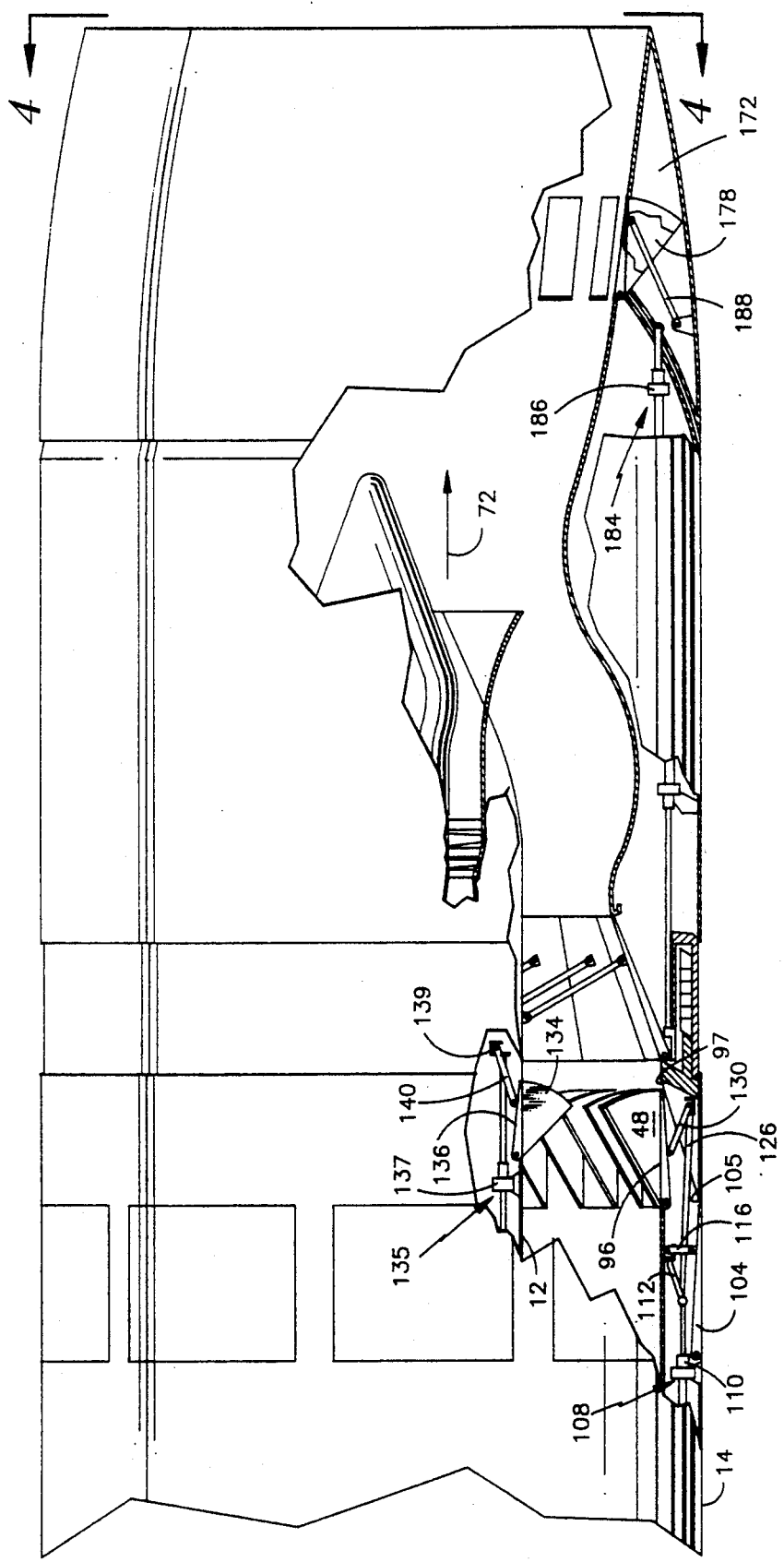
FIG. 3 is an enlarged portion of FIG. 1 showing portions of the sound suppression structure of the gas turbine engine powerplant in the deployed position at a low power, high altitude operative condition of the powerplant.

FIG. 3 is a side elevation view of the gas turbine engine powerplant 10 shown in FIG. 2 showing the relationship of the components of the powerplant at a lower power, higher altitude operative condition of the engine, such as the cruise power operative condition. At the cruise power operative condition noise is of little concern. The actuator 108 has translated the links 112, 116 and links 126, 130 in the third mixing region axially rearwardly, pushing the second flap 104 in the outer duct wall 14 radially outwardly to close of the entrance 105 to the ejector passage 102 and pulling the first flap 96 radially outwardly from the ejector/mixer lobe 88 to seal the inner opening 97 of the ejector through the outer duct wall. In a like manner, the actuator 135 at the inner duct wall 12 with its ball-screw drive 137 has been translated axially, pushing the unison ring 139, and link 140 rearwardly, pulling the flap 136 inwardly into the stowed position for the flap. As can be seen, only the sidewalls 98, 134 extend into the working medium flowpath and, by reason of their axial orientation, reduce significantly any distortion and losses that the ejector/mixer would introduce to the flow during the cruise operative condition. In an alternate embodiment, the sidewalls 98, 134 might be partially translatable into the duct wall, independently of the flap, to decrease the protrusion of the sidewalls into the secondary flowpath.

In the second mixing region 78, the actuator 184 with its ball and screw drive 186 axially translates the nozzle exit body 172 in the forward direction. The nozzle exit body closes the ejector flowpath passage 168 from the exterior of the outer duct wall to the interior of the nozzle section. As the ball and screw drive 186 pulls the nozzle exit body 172 forwardly, the nozzle exit body acts as a unison ring pulling the links 188 forwardly, causing the links 188 to rotate about their hinge joints 192 and pulling the ejector/mixer lobes 178 radially outwardly to the stowed position in openings 174.

FIG. 4 is a view taken along the lines 4—4 of FIG. 3 showing the inner duct wall 12 and the outer duct wall 14 which bound the nozzle flowpath 72. The outer duct wall carries sound suppression structure 18 which faces the flowpath to absorb acoustic energy from the mixing gases. The lobed mixer 152 is shown at the downstream end of the gas turbine engine. Further upstream, the sidewalls 134 of the second plurality of mixer lobes 94 of the third mixing region are shown with the flap 136 of the ejector/mixer lobes in the stowed position.

Figure 4A:
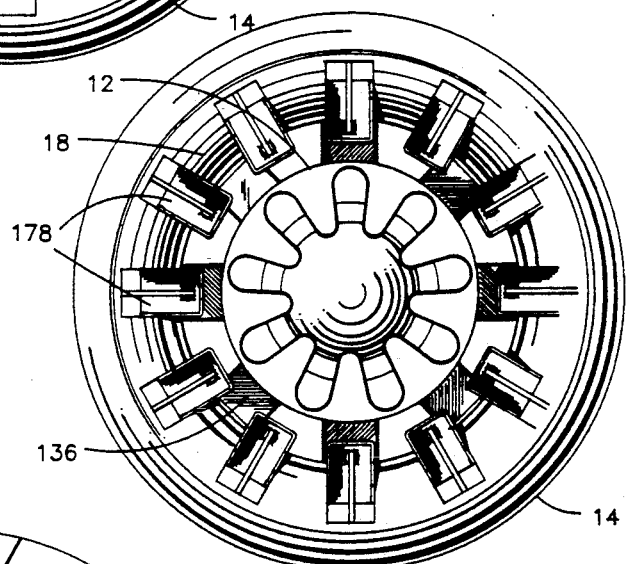
FIG. 4a is a view taken along the lines 4a—4a of FIG. 2.

FIG. 4a is a view similar to the view shown in FIG. 4 taken along the lines 4a—4a of FIG. 2 showing the second mixer lobes 134 of the third mixing region 80 and the ejector/mixer lobes of the second mixing region 78 in their deployed position.

Figure 5:
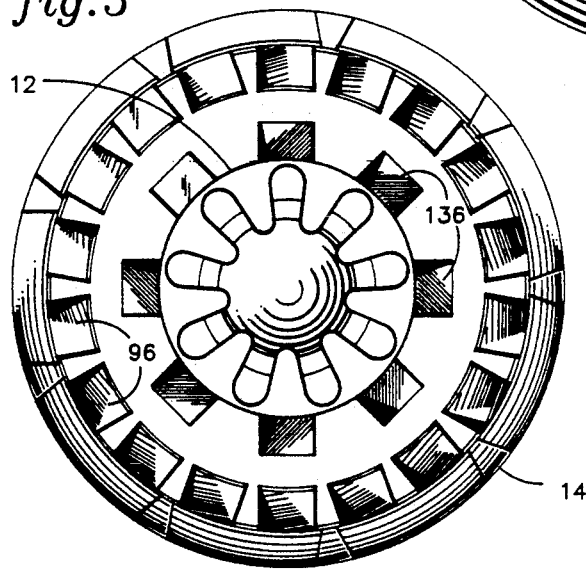
FIG. 5 is a view taken along the lines 5—5 of FIG. 2.

FIG. 5 is a view taken along the lines 5—5 of FIG. 2 showing the relationship of the first plurality of ejector/mixer lobes 88 and the second plurality of mixer lobes 134 of the third mixing region 80 with the positioning links broken away for purposes of clarity and simplicity. As can be seen, the lobes of the first plurality of ejector/mixer drives additional gases from the outside and a portion of the working medium gases from the interior radially inwardly. The second plurality of mixers 134 drives secondary flowpath gases radially outwardly to provide mixing in the secondary flowpath.

During operation of the gas turbine engine powerplant 10 shown in FIG. 1, working medium gases are flowed into the inlet section 22 of the powerplant. Energy is added to the working medium gases in the primary flowpath 44 and secondary flowpath 46 by burning fuel or by doing mechanical work on the gases. This increases the velocity and pressure of the working medium gases. In the secondary flowpath, the energy might be added by fan blades 56 or by a duct burner 58 or by a combination of a duct burner and fan blades.

At a high power, low altitude operative condition, such as sea-level take-off, additional gases from outside the powerplant are flowed through the ejector/mixers 88, 178 in the outer duct wall. Additional gases are flowed to the secondary flowpath 46 at the first ejector/mixer 86 in the third mixing region 80 which is in its deployed position. The ejector/mixer causes mixing of the outside gases with working medium gases in the secondary flowpath. This increases the mass flow of the gases along the secondary flowpath. These gases are mixed at the high power operative condition to lower the temperature and velocity of the working medium gases.

The secondary flowpath 46 for working medium gases is converged along the first part 142 of the outer duct wall to increase the velocity of the gases and then diverged along the second part 144 of the outer duct wall. Diverging the secondary flowpath 46 for working medium gases diffuses the gases and increases mixing of the gases in the third mixing region and intensifies the effect of large vortices created by the ejector/mixer. Examples of such large vortices and the effect of diffusion on mixing are discussed in U.S. Pat. No. 4,835,961 entitled "Fluid Dynamic Pump" issued to Presz et alia. This results in convective mixing between the gases from the exterior of the engine and the secondary flowpath.

The mixed gases in the secondary flowpath 46 are flowed into the first mixing region 76 at the end of the inner duct wall 12 and thence into the nozzle section 26 downstream of the third mixing region. Gases from the secondary flowpath 46 and from the primary flowpath 44 are converged and mixed at the lobed mixer 152 at both high power operative conditions and low power operative conditions. The mixed gases have increased mass flow because of the additional gases from the upstream ejector and decreased temperature because of the lower temperature level of the additional gases that are brought into the secondary flowpath.

The nozzle flowpath 72 diverges in the first mixing region 76 in the nozzle section 26 downstream of the gas turbine engine section 24. Divergence of the flowpath decreases the velocity of the mixed gases and speeds mixing of the large vortices which extend from the lobes of the fixed lobe mixer at the end of the gas turbine engine. The vorticity associated with the convoluted mixers washes boundary layers off the wall, thereby preventing flow separation. This allows the diffuser to be designed very aggressively for example, it is believed that diffuser wall angles with respect to the axis in the order of twenty degrees (20°) will perform satisfactorily.

The gases are flowed along the diverging nozzle flowpath 72 from the first mixing region 76 into the second mixing region 78. An additional amount of gases are flowed through the outer duct wall 14 at the lobed ejector/mixer 178 to provide an additional amount of gases into the second mixing region 78 at the high power, low altitude operative condition. The additional amount of gases from outside the powerplant is mixed with working medium gases in the diverging nozzle flowpath. The diverging walls diffuse the gases and increase mixing between the large vortices formed by the ejector/mixer lobes. At all stations along the flowpath, the sound absorbing structure 18 is positioned adjacent to the flowpath by the outer duct to absorb noise from the stream of gases.

Reducing the velocity of the gases enables the sound absorbing structure 18 to more efficiently absorb the noise energy associated with the working medium gases. Reducing the velocity of the gases exiting the engine further decreases noise by reducing shear between molecules of the jet exhaust and molecules of the gases in the atmosphere.

At cruise operative conditions, the ejector/mixer lobes 88 are effectively removed from the secondary flowpath by stowing the flaps and the ejector/mixer lobes 178 are completely removed from the nozzle flowpath 72 by stowing the lobes in the openings 174 of the nozzle exit body.

An advantage of the present design is the efficiency of the engine at all operative engine conditions which results from only reducing the level of noise at low altitude operative conditions. Although reducing the noise results from reducing the velocity of the jet at high power, low altitude operation, the ejector/mixers entrain additional masses of air to offset the loss of thrust due to the decrease in velocity. In addition, decreasing the velocity of the gases upstream of the fixed lobed mixer 152 by injecting an additional mass of air enables an increase in mass flow without disrupting the flowpath 72 to the extent that would occur if all the additional masses of gases were injected downstream of the fixed lobed mixer.

Another advantage of the present invention is the simplicity of the mechanical design which permits deploying lobe-type mixers 88, 178 in the secondary flowpath 46 and the nozzle flowpath 72 at high power, low altitude operation while removing these two lobe-type mixers from the flowpaths at low power, cruise operative conditions. This has the advantage of minimum disruption to the secondary and nozzle flowpaths at cruise when noise is of no concern.

One advantage of the mechanical design of the third mixing region 80 is the minimal intrusion into the secondary flowpath 46 of the lobed mixers 88 in the stowed position. In addition, in the stowed position, the radial profile is only the thickness of the flaps 96, 104, 136 for both the outer mixers and the inner mixers and the radial height of the respective actuators and links. The small radial profile of the outer duct wall and the inner duct wall reduces the cross-sectional diameter of the powerplant and drag on the powerplant nacelle with a concomitant beneficial effect on engine efficiency.

As will be realized, either the second mixing region 78 or the third mixing region 80 might be eliminated. In such cases, the engine would have a combination of the first mixing region 76 and the second mixing region 78 or a combination of the first mixing region 76 and the third mixing region 80 to reduce the velocity gases at the exit of the gas turbine engine powerplant. In either case, mixing takes place with large vortices in a diffusing section of the working medium flowpath which enables aggressive design of the diffusing section.

Although the invention has been shown and described with respect to detailed embodiments thereof, it should be understood by those skilled in the art that various changes in form and detail thereof may be made without departing from the spirit and the scope of the claimed invention.

We claim:

1. A method for operating the gas turbine engine powerplant at a high power, low altitude operative condition and at a lower power, higher altitude operative condition, the powerplant having an axis of rotation and radially extending directions with respect to the axis which extend inwardly and outwardly, the powerplant further having a gas turbine engine section, an inlet section upstream of the engine and a nozzle section downstream of the engine, the nozzle section having a working medium flowpath which is inwardly bounded by an afterbody extending downstream from the engine and outwardly bounded by an outer duct wall, the gas turbine engine having a primary flowpath for working medium gases which is annular, which extends axially through the engine and which is outwardly bounded at the downstream end by a lobed mixer having a plurality of first passages oriented to permit the radial outward flow of gases from the primary flowpath, a secondary flowpath for working medium gases outwardly of the primary flowpath which extends axially through the engine, the secondary flowpath being inwardly bounded by an inner duct wall and the lobed mixer at the downstream end of the engine, the lobed mixer having a plurality of second passages interposed between the plurality of first passages, each second passage being oriented to permit the radial inward flow of gases from the secondary flowpath, the secondary flowpath being outwardly bounded by the outer duct wall which extends forwardly from the nozzle section, the outer duct wall bounding a first mixing region having said lobed mixer and a second mixing region which is in flow communication with the first mixing region and which is spaced axially from said first lobed mixer, the second mixing region having an ejector and a second mixer which extends inwardly from the outer duct wall, said second mixer having a plurality of first passages penetrating radially inwardly from the exterior of the power plant and having a plurality of second passages extending between the first passages to permit the flow of hot gases from one of said working medium flowpaths between the second passages, which comprises:

flowing working medium gases through the inlet section of the powerplant to the primary flowpath for working medium gases and the secondary flowpath for working medium gases;

adding energy to the working medium gases in the primary flowpath and the secondary flowpath which increases the velocity and pressure of the working medium gases;

mixing the gases from the primary flowpath and the secondary flowpath with the first lobed mixer in the first mixing region of the engine;

diverging the flowpath in the first mixing region to diffuse the working medium gases of the primary flowpath and the secondary flowpath;

flowing an additional amount of gases at the high power operative condition from outside the powerplant through the ejector in the outer duct wall to the second mixing region at the second mixer and blocking the flow of additional gases into the secondary mixing region at the low power operative condition;

mixing the additional amount of gases from the exterior of the power plant with working medium gases on the interior of the power plant in the second mixing region at the high power operative condition;

diverging the flowpath for working medium gases on the interior of the power plant to diffuse the gases from the interior of the engine and to diffuse the additional gases from the exterior of the power plant in the second mixing region to increase the mixing of the exterior gases and the interior gases;

flowing these mixed gases which include gases from the primary flow path on the interior of the power plant over sound absorbing structure mounted in the inwardly facing surface of the outer duct to decrease the noise level associated with the gases.

2. A method of operating the gas turbine engine powerplant of claim 1 wherein the second mixing region is downstream of the first mixing region and the step of mixing the gases on the interior of the power plant includes mixing gases from the primary flowpath and gases from the secondary flowpath for working medium gases with the gases from the exterior of the power plant.

3. The method of operating the gas turbine engine powerplant of claim 1 wherein the second mixing region is upstream of the first mixing region and wherein the step of mixing additional working medium gases includes the step of drawing in additional gases through an ejector at the mixer and mixing the additional gases with gases on the interior of the engine in the secondary flowpath prior to the step of mixing the gases from the secondary flowpath with gases from the primary flowpath.

4. The method of operating the gas turbine engine power plant of claim 1 which includes the step of converging the flow of gases from discharge of the second mixing region prior to the gases entering the first mixing region.

5. The method of operating the gas turbine engine powerplant of claims 1, 2, 3 or 4, wherein the gas turbine engine powerplant is a gas turbine engine powerplant which has deployable ejector/mixer lobes in the second mixing region, each of the deployable ejector/mixer lobes having a stowed position in the outer duct wall which removes the stowed portion of the ejector/mixer from the flowpath for working medium gases and a deployed position in the flowpath for working medium gases wherein the ejector/mixer lobes permit the flow of gases from the exterior of the engine to the interior of the engine and provide for mixing of the gases, wherein the step of flowing additional gases from outside the powerplant and mixing the gases in the second mixing region includes the step of moving the ejector/mixer lobes from the stowed position to the deployed position in the flowpath permitting flow through the ejector and mixing the gases.

6. A method for operating a gas turbine engine powerplant at a high power, low altitude operative condition and at a lower power, higher altitude operative condition, the powerplant having an axis of rotation and radially extending directions with respect to the axis which extend inwardly and outwardly, the powerplant further having a gas turbine engine section having a gas turbine engine, an inlet section upstream of the engine and a nozzle section downstream of the engine, the nozzle section being inwardly bounded by an after body downstream of the engine and outwardly bounded by an outer duct wall, the gas turbine engine having a primary flowpath for working medium gases which is annular and which extends axially through the engine, a secondary flowpath for working medium gases outwardly of the primary flowpath which extends axially through the engine, the secondary flowpath being inwardly bounded by an inner duct wall which terminates in a lobed mixer at the downstream end of the engine and outwardly bounded by the outer duct wall which extends forwardly from the nozzle section, the outer duct wall bounding a first mixing region, a second mixing region at the end of the inner duct wall downstream of the first mixing region and a third mixing region upstream of the first mixing region, the outer duct wall having an ejector and second mixer in the second mixing region and an ejector and third mixer in the third mixing region, which comprises:

flowing working medium gases through the inlet section of the powerplant;

adding energy to the working medium gases in the primary flowpath and the secondary flowpath which increases the velocity and pressure of the working medium gases;

flowing additional gases at the high power operative condition from outside the power plant through the ejector in the outer duct wall to the secondary flowpath at a mixer in the third mixing region for mixing the outside gases with working medium flowpath gases to increase the mass flow of gases along the secondary flow path and blocking the flow of additional gases into the third mixing region of the lower power operative condition;

mixing the gases in the third mixing region at the high power operative condition to lower the temperature and velocity of the working medium gases;

converging the secondary flowpath for working medium gases to increase the velocity of the gases;

diverging the secondary flowpath for working medium gases to diffuse the gases and increase mixing of the gases in the third mixing region;

flowing the mixed gases in the secondary flowpath into the first mixing region downstream of the third mixing region at the end of the inner duct wall and into the nozzle section;

mixing the gases from the secondary flowpath with the gases from the primary flowpath at the high power operative condition and the lower power operative condition;

converging the nozzle flowpath in the nozzle section to increase the velocity of the mixed gases;

diverging the nozzle flowpath to cause diffusion of the working medium gases and to increase mixing of the working medium gases;

flowing the mixed gases into the second mixing region in the nozzle section;

flowing an additional amount of gases at the high power operative condition from outside the powerplant through the ejector in the outer duct wall at a mixer in the second mixing region into the nozzle flowpath and blocking the flow of an additional amount of gases into the second mixing region at the lower power operative condition;

mixing the additional amount of gases from outside the powerplant with the mixed gases in the nozzle flowpath at the high power operative condition;

diverging the nozzle flowpath to increase diffusion of the gases and to increase mixing of the gases;

flowing the mixed working medium gases adjacent to sound absorbing structure which is positioned by the outer duct to reduce the noise associated with the gases.

7. The method for operating the gas turbine engine powerplant of claim 6 wherein the gas turbine engine powerplant is a turbofan gas turbine engine powerplant which has a deployable ejector and mixer formed of a plurality of deployable ejector/mixer lobes in the second mixing region and an ejector and mixer having a portion which is deployable in the third mixing region, each of the deployable ejector mixers having a stowed position in the outer wall duct which removes the stowed portion of the ejector and mixer from the flowpath for working medium gases and a deployed position in the flowpath for working medium gases wherein the ejector and mixer permit the flow of gases from the exterior of the engine to the interior of the engine and provide for mixing of the gases, wherein the step of flowing additional gases from outside the powerplant and mixing the gases in the second mixing region includes the step of deploying the ejector/mixer lobes into the flowpath to permit the ejector to flow gases in the radial direction into the flowpath and cause mixing of the gases and wherein the step of flowing additional gases from outside the powerplant and mixing the gases in the third mixing region includes the step of moving the deployable portion of the ejector/mixer lobes from the stowed position to the deployed position such that the lobes extend into the secondary flowpath, permitting the radial flow of gases through the outer duct wall and mixing of the additional gases from the exterior of the engine with the gases in the flowpath for working medium gases.

8. A noise suppression system for a gas turbine engine powerplant having a primary flowpath for working medium gases which extends through the gas turbine engine, and non-primary flowpaths which include, a secondary flowpath for working medium gases and a nozzle flowpath which is in flow communication with the primary and secondary flowpaths, which comprises:

first diffusion region having a lobed mixer for mixing gases from the primary flowpath and secondary flowpath, and a diverging nozzle flowpath downstream of the mixer;

a second diffusion region spaced axially from the lobed mixer and in flow communication with the first diffusion region, the second diffusion region having one of said non-primary flowpaths and an ejector and second mixer in flow communication with the exterior of the engine for providing additional gases to the non-primary flowpath, the flowpath having a diverging portion downstream of the ejector and second mixer; and sound absorbing structure adjacent at least one flowpath non-primary which faces the divergent portion for absorbing acoustic energy from non-primary flowpath;

wherein the additional gases increase mass flow through the engine and decrease the exhaust velocity from the engine to increase the effectiveness of the sound absorbing structure and decrease jet noise.

9. A noise suppression system for a turbofan, gas turbine engine powerplant having a high power, low altitude operative condition and a low power, higher altitude operative condition, the powerplant having an axis of rotation $A_r$ and radially extending directions with respect to the axis which extend inwardly and outwardly, the powerplant further having an inner duct wall extending circumferentially about the axis A, and an outer duct wall spaced radially from the inner duct wall leaving an annular passage therebetween, and which extends forwardly and rearwardly beyond the inner duct wall, the power plant including an inlet section in flow communication with the exterior of the powerplant and having an inlet flowpath for working medium gases which is outwardly bounded by the outer duct wall, a gas turbine engine section which has a gas turbine engine having a compressor having a plurality of fan blades, a combustor and a turbine, a primary flowpath for working medium gases in flow communication with the inlet flowpath and outwardly bounded by the inner duct wall, and a secondary flowpath for working medium gases in flow communication with the inlet flowpath and which extends through the annular flowpath and through the fan blades of the compressor;
- a nozzle section downstream of the gas turbine engine section, the nozzle section having a nozzle flowpath for working medium gases which is in flow communication with the primary and secondary flowpaths for working medium gases, which extends to the exit of the gas turbine engine powerplant and which is outwardly bounded by the outer duct wall, which comprises:
  - a first mixing region which has
    - a lobed mixer attached to the downstream end of the inner duct wall, the mixer having a wall portion which extends circumferentially having a plurality of adjoining lobes, each lobe extending axially in the downstream direction, the plurality of lobes having a plurality of first passages penetrating outwardly into the secondary flowpath to permit radial outward flow of hot gases from the primary flowpath and having a plurality of second passages penetrating inwardly to permit radial inward flow of working medium gases from the secondary flowpath;
    - a first portion of the outer duct wall outwardly of the mixer converging toward the axis $A_r$ to increase the velocity of working medium gases in the secondary flowpath, the outer duct wall diverging in the nozzle section to cause diffusion and increase mixing of the gases from the secondary and primary flowpaths, the outer duct wall has sound suppression structure facing the flowpath to absorb acoustic energy from the mixing gases;
  - a second mixing region downstream of the first mixing region having an axially movable nozzle exit body having
    - an annular ejector passage which extends through the outer duct wall to the nozzle flowpath at the high power operative condition of the powerplant between the nozzle exit body and adjacent structure of the nozzle section;
    - a plurality of stowable mixer lobes, each having a stowed position in the outer duct wall at which the nozzle exit body blocks flow through the ejector passage and at which the mixer lobe does not extend into the working medium flowpath and a deployed position which extends into the nozzle flowpath to provide a passage for ejector flow which penetrates the nozzle flowpath, the deployed mixer lobes being circumferentially spaced one from the other leaving a plurality of axial passages therebetween for gases of the nozzle flowpath upstream of the mixer lobes to permit mixing of gases from the exterior with gases on the interior to decrease the temperature and the velocity and increase the mass flow of the gases through the nozzle section;
    - the outer duct wall in the nozzle section diverging to increase mixing downstream of the mixer, the outer duct wall having sound suppression structure facing the flowpath to absorb acoustic energy from the mixing gases;
  - a third mixing region upstream of the first mixing region in the secondary flowpath having
    - a plurality of circumferentially spaced ejector passages which extend through the outer duct wall to the secondary flowpath at the high power operative condition;
    - a first plurality of mixer lobes spaced circumferentially one from the other leaving a passage for secondary working medium gases therebetween, one of each of said mixer lobes at each passage, each mixer lobe having a pair of sidewalls which extend in the radial inward direction and which extend axially in the downstream direction, the height $H_o$ of each sidewall increasing in the downstream direction, a stowable ejector door which rotatably engages the outer duct wall between the upstream ends of the sidewalls, the stowable door having a stowed position in which the door blocks the ejector passage and does not extend into the secondary flowpath for working medium gases at the lower power operative condition and a deployed position at the higher power operative condition in which the door extends into the secondary flowpath at an angle to the outer duct wall and between a pair of associated sidewalls to form a chute-type mixer lobe bounding an ejector flowpath for additional gases extending in the radial direction through the ejector into the secondary flowpath;
    - a second plurality of mixer lobes spaced circumferentially one from the other leaving a passage for secondary working medium gases extending axially therebetween, each mixer lobe of the second plurality of mixer lobes having a pair of sidewalls which extend in the radial outward direction and which extend axially in the downstream direction, the height $h_i$ of each sidewall increasing in the downstream direction, and a stowable door which rotatably engages the inner duct wall between the upstream ends of the sidewalls, the stowable door having a stowed position in the inner duct wall in which the door does not extend into the secondary flowpath at the lower power operative condition and having a deployed position at which the door extends into the secondary flowpath at an angle to the inner duct wall and between a pair of associated sidewalls to form a chute-type mixer lobe to drive a portion of the secondary working medium gases radially outwardly,
    - the outer duct wall in the third mixing region has a first portion which extends radially inwardly in the downstream direction to converge the secondary flowpath and increase the velocity of the gases and which diverges thereafter in the downstream direction to diffuse the gases and increase mixing of the gases in the third mixing region; the outer duct wall having second absorbing structure disposed in the outer duct wall which faces the working medium flowpath
  - wherein the additional working medium gases and the diffusing portion in the mixing regions which increase mixing of the additional gases and the working medium gases causes decreases of temperature and velocity of the gases in the primary and secondary flowpaths to reduce noise.

* * * * *

UNITED STATES PATENT AND TRADEMARK OFFICE
CERTIFICATE OF CORRECTION

PATENT NO. : 5,157,916
DATED : October 27, 1992
INVENTOR(S) : Wynosky et al

It is certified that error appears in the above-indentified patent and that said Letters Patent is hereby corrected as shown below:

On the title page:
Abstract Line 8, "second" should be --secondary column 10, line 65: "the" should be --a--.

column 11, line 51: "after the word gases" should be --and increase the rate of mixing between the working medium gases--.

column 12, line 54, "after body" should be --afterbody--.

column 13, line 60: "after the word flowing" should be --at least a portion of --.

column 14, line 33: "before the word first" should be --a--.

column 14, lines 47 & 48 the word "flowpath" should be deleted and inserted after "non primary".

column 14, line 62 "a" should be --A--.

Signed and Sealed this

Twenty-eighth Day of December, 1993

Attest:

BRUCE LEHMAN

Attesting Officer    Commissioner of Patents and Trademarks